US006304728B1

(12) United States Patent
Bittner

(10) Patent No.: US 6,304,728 B1
(45) Date of Patent: Oct. 16, 2001

(54) CAMERA WITH FLASH UNIT DISPOSED IN BETWEEN VIEWFINDER LENSES

(75) Inventor: Wilfried Bittner, Tsuen Wan (HK)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 09/524,158

(22) Filed: Mar. 14, 2000

(51) Int. Cl.[7] .................................................. G03B 15/03
(52) U.S. Cl. ........................... 396/177; 396/373; 396/448
(58) Field of Search ................................. 396/176, 177, 396/178, 373, 448

(56) References Cited

U.S. PATENT DOCUMENTS

| | | | |
|---|---|---|---|
| 3,153,955 | 10/1964 | Bretthauer et al. ..................... | 95/11 |
| 3,852,790 | 12/1974 | Roinson ................................. | 354/145 |
| 3,882,514 | 5/1975 | Graham ................................. | 354/149 |
| 4,100,554 | 7/1978 | Iijima .................................... | 354/145 |
| 4,106,037 | 8/1978 | Nakamura et al. ................... | 354/128 |
| 4,106,077 | 8/1978 | Furda ..................................... | 362/8 |
| 4,130,356 | 12/1978 | Yamanaka ............................. | 354/145 |
| 4,166,681 | 9/1979 | Imura et al. .......................... | 354/149 |
| 4,166,682 | 9/1979 | Schrader ............................... | 354/187 |
| 4,279,488 * | 7/1981 | Hines .................................... | 396/176 |
| 4,299,465 | 11/1981 | Chan ..................................... | 354/145 |
| 4,350,420 | 9/1982 | Engelsmann et al. ................ | 354/145 |
| 4,525,046 | 6/1985 | Takaoka et al. ................ | 354/149.11 |
| 4,589,747 | 5/1986 | Nakayama et al. ............. | 354/149.11 |
| 4,609,269 | 9/1986 | Kamata ........................... | 354/149.11 |
| 4,758,852 | 7/1988 | Maejima ................................ | 354/75 |
| 4,796,034 * | 1/1989 | Leondard et al. .................... | 396/178 |
| 4,804,992 | 2/1989 | Moriyama et al. ................... | 354/471 |
| 4,831,399 | 5/1989 | Tsurukawa et al. .................. | 354/221 |
| 4,847,647 | 7/1989 | Ueda .................................. | 354/149.1 |
| 4,893,139 | 1/1990 | Alligood et al. ................... | 354/149.1 |
| 4,893,140 | 1/1990 | Yamamoto et al. ............. | 354/149.11 |
| 4,920,368 | 4/1990 | Arai et al. ......................... | 354/145.1 |
| 4,945,368 | 7/1990 | Ishino et al. ..................... | 354/149.11 |
| 4,983,999 | 1/1991 | Meisezahi et al. ............. | 354/149.11 |
| 4,992,810 | 2/1991 | Schappler ........................ | 354/149.11 |
| 4,996,548 | 2/1991 | Schappler et al. .............. | 354/149.11 |
| 5,023,639 | 6/1991 | Ushiro et al. ......................... | 354/132 |
| 5,065,177 | 11/1991 | Yamamoto et al. ................. | 354/403 |
| 5,066,967 | 11/1991 | Yamamoto et al. ............ | 354/149.11 |
| 5,107,287 * | 4/1992 | Swayze ............................. | 396/178 X |

(List continued on next page.)

Primary Examiner—W. B. Perkey
(74) Attorney, Agent, or Firm—Woodcock Washburn Kurtz Mackiewicz & Norris LLP

(57) ABSTRACT

The camera of this invention may include a first viewfinder lens disposed in the front of the camera and a second viewfinder lens disposed in the back of the camera. Preferably, these viewfinder lenses are affixed to the camera and are non-moveable. A camera of this invention may further include a flash that is moveable between a stored position and an operable position. The stored position is preferably defined by a viewfinder air space and is defined at least in part by a space between the first and second viewfinder lenses. In its operable position, the flash moves relative to the viewfinder air space so that a camera user can focus on an object whose picture is being taken through the viewfinder lenses. The camera may further include a lens and a lens cover. The lens cover is preferably moveable between a covered position, in which it covers the lens and an uncovered position, in which it does not obstruct the path of light through the lens. Preferably, the camera further includes an actuator for moving the lens cover and the flash. In a preferred embodiment the actuator is moveable between a first position and a second position. When the actuator is in the first position, the flash is preferably in the stored position and the lens cover is in the covered position. When the actuator is moved to its second position, the flash moves from its stored position to its operable position and the lens cover moves from its covered position to its uncovered position.

34 Claims, 6 Drawing Sheets

U.S. PATENT DOCUMENTS

| | | | |
|---|---|---|---|
| 5,146,243 | 9/1992 | English et al. | 346/140 |
| 5,146,252 | 9/1992 | Burnham | 354/149.11 |
| 5,146,253 | 9/1992 | Swayze | 354/187 |
| 5,233,378 | 8/1993 | Hosokawa et al. | 354/149.11 |
| 5,253,002 | 10/1993 | Kwak | 354/126 |
| 5,255,032 | 10/1993 | Michaud | 354/149.11 |
| 5,270,754 | 12/1993 | Newman | 354/149.11 |
| 5,565,942 | 10/1996 | Hagimoto et al. | 396/177 |
| 5,598,238 | 1/1997 | Stephenson, III et al. | 396/178 |
| 5,652,920 | 7/1997 | Kaihara et al. | 396/62 |
| 6,078,753 * | 6/2000 | Allen | 396/176 |

* cited by examiner

CAMERA WITH FLASH UNIT DISPOSED IN BETWEEN VIEWFINDER LENSES

BACKGROUND OF THE INVENTION

This invention relates to a camera that has a flash that is moveable between a stored position in which the flash is disposed in a viewfinder air space that is defined between a pair of non-moveable viewfinder lenses and an operable position in which the flash is at least partially external to the viewfinder air space.

Because of the consumer appeal for cameras of a relatively small size, camera manufactures endeavor to decrease the size of cameras. This consumer appeal stems from a variety of factors, such as, the fact that smaller cameras are typically easier to transport. Furthermore, smaller cameras may in some instances be easier to operate and manipulate to focus on a subject.

By way of example, efforts to reduce the size of camera are disclosed in U.S. Pat. No. 5,253,002 ('002 patent) issued to Kwak. Kwak teaches a camera that has a flash unit, a conveyance means that supports the flash unit for movement between a storage position and an operative position. In the storage position the conveyance means rests in the viewfinder air space, and in the operative position the conveyance means is translated above the viewfinder air space.

As shown in Kwak, the camera lens and the camera viewfinder are both disposed within the conveyance means, so that when the conveyance moves the camera lens and the viewfinder moves with the conveyance means. Further, the conveyance means of Kwak must be sized so that when it moves the viewfinder is aligned with the viewfinder air space and the lens is aligned with the additional camera lenses that permit light to enter the camera to expose the film. One potential disadvantage of the camera taught by Kwak is that if the camera user does not move the conveyance means properly so as to align the camera lenses, the film may not be properly exposed.

U.S. Pat. No. 5,146,253 (Swayze) teaches a camera that has a retractable optical viewfinder module that moves between a stored position and an operable position. In the stored position the viewfinder module rests within the space defined by the lenses of the IR module. In order to operate the camera the viewfinder module is withdrawn from this space.

The camera of this invention is an improved camera that permits the reduction in camera size by storing a moveable flash unit in a viewfinder air space that is defined by a pair of stationery viewfinder lenses.

SUMMARY OF THE INVENTION

The camera of this invention includes a first viewfinder lens that is disposed in a front of the camera and a second viewfinder lens that is disposed in a back of the camera. The first and the second viewfinder lenses are rigidly mounted to the camera, so that they are not moveable. A viewfinder airspace may be defined between the first viewfinder lens, the second viewfinder lens, a top of the camera, and a pair of viewfinder air space sides and a viewfinder air space bottom. Disposed within the viewfinder air space is a moveable flash.

The flash is movable between an operable position and a stored position. In the stored position, the flash is stowed in the viewfinder air space between the first and the second viewfinder lenses. Because the flash is stored in the viewfinder air space, the flash may at least partially obstruct the view through the viewfinder lenses when it is in the stored position. As mentioned, the flash is movable to an operable position relative to the viewfinder lenses. In this operable position, at least a portion of the flash is disposed external to the viewfinder air space. Consequently, in the operable position, the camera user can look through the viewfinder lenses to focus on a subject, and the flash can be operated to provide light to illuminate the subject.

The camera of this invention further includes a picture taking lens, that is disposed in the front of the camera, and a lens cover. Preferably, the lens cover is moveable between a lens covered position and a lens uncovered position. In the lens covered position, the lens cover covers the picture taking lens to protect it from being scratched, damaged or becoming dirty. Conversely, in the lens uncovered position, the lens cover does not obstruct the path of light through the picture taking lens.

The camera of this invention may further include an actuator for moving the flash between the stored position and the operable position and the lens cover between the covered position and the uncovered position. In a preferred embodiment the actuator is moveable between the first position and a second position. When the actuator is in the first position the flash is in the stored position and the lens cover is in the covered position. Upon movement of the actuator to its second position, the lens cover moves to the uncovered position and the flash moves to the operable position.

In a preferred embodiment of this invention, the camera further includes an operating mechanism coupled to the actuator. This operating mechanism can be manipulated by a camera user, so that the camera user can move the lens cover between the uncovered position and the covered position and the flash between the stored position and the operable position.

In one embodiment of this invention, the operating mechanism comprises a tab and the actuator is defined in part by a rotatable ring. The tab is preferably coupled to the rotatable ring and the rotatable ring is coupled to the lens cover and the flash. Thus, a camera user can manipulate the tab to move the rotatable ring and thus move the lens cover and the flash.

In another preferred embodiment of this invention, the operating mechanism comprises a push button and the actuator comprises a spring. This spring preferably biases the flash in the operable position. The actuator preferably further includes a mechanism for holding the flash in the stored position against the biasing of the spring. The push button can be manipulated to release the flash so that the spring exerts a force to move the flash between the stored position and the operable position. Preferably the flash in this embodiment is coupled to the lens cover, so that movement of the flash from the stored position to the operable position causes the lens cover to move from the covered position to the uncovered position.

In another preferred embodiment of this invention, the actuator includes ribs extending along a periphery of a flash housing that houses the flash. The camera user can push the flash between the stored position and the operable position by pushing along the ribs on the side of the flash housing. In this embodiment, the flash is preferably coupled to the lens cover so that when the flash is moved from the stored position to the operable position, the lens cover is moved from the covered position to the uncovered position.

Other features of the invention are described below.

DETAILED DESCRIPTION OF THE PREFERRED EMBODIMENTS

Figure 1:
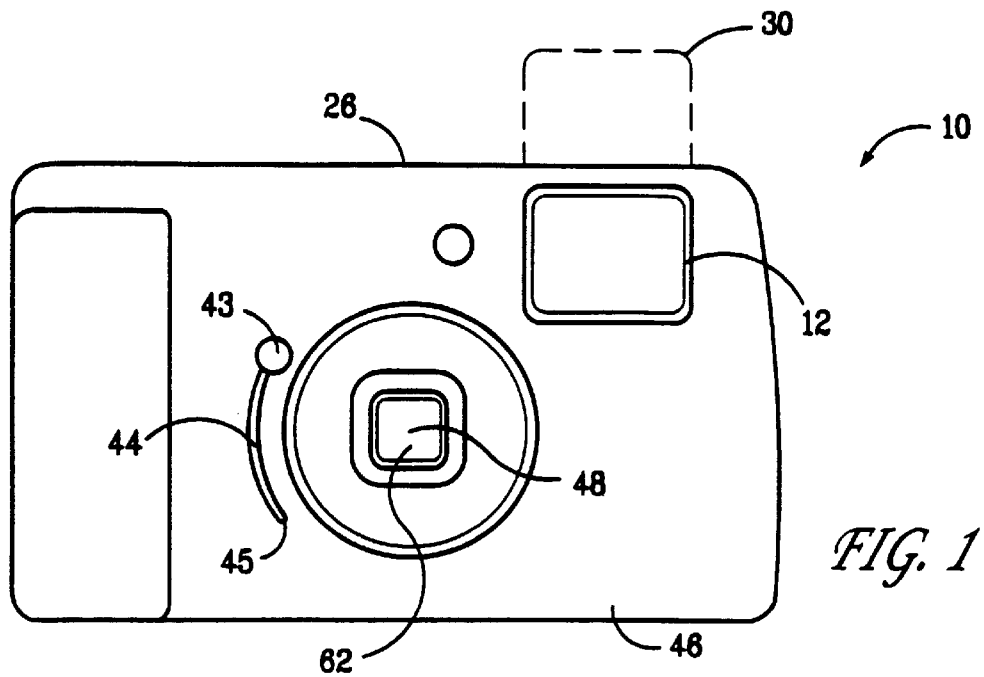
FIG. 1 is a front view of camera according to a first preferred embodiment of this invention.

FIGS. 1–6 depict a camera 10 according to a first preferred embodiment of this invention that has a pair of rigidly mounted viewfinder lenses 12, 14 and a moveable flash 16 that may be stored in the viewfinder air space 18 defined at least in part by the pair of viewfinder lenses 12, 14. Typically, this viewfinder air space 18 is devoid of any structure, with the exception of the moveable flash 16. By storing the flash 16 in the viewfinder air space 18, the overall size of the camera 10 may be reduced. This occurs because the flash 16 may be stored in the viewfinder air space 18, as opposed to a separate space within the camera 10 that must be created to house the flash 16. Since the viewfinder camera lenses are rigidly fixed to the camera, the camera 10 of this invention reduces the likelihood of damage to the viewfinder 12, 14 lenses that is associated with viewfinder lenses that move. Furthermore, by having stationary viewfinder lenses the camera of this invention potentially decreases the number and complexity of the moveable parts of the camera 10, which may be advantageous during the manufacturing process.

The camera 10 has a camera lens 20 for exposing the camera film to light reflected from an object whose picture is being taken with the camera 10. The camera 10 shown in this embodiment may be any of a variety of types of cameras including, but not limited to, an Advanced Photo System (APS) film camera, a 35 mm. film and a digital camera. These examples are provided by way of illustration and not by way of limitation. The camera may be of the reusable type in which the camera user reloads film into the camera 10 after the camera user has completed using a cassette of film. Alternatively, the camera of this invention may be practiced in connection with a so called "single use camera."

Figure 5:
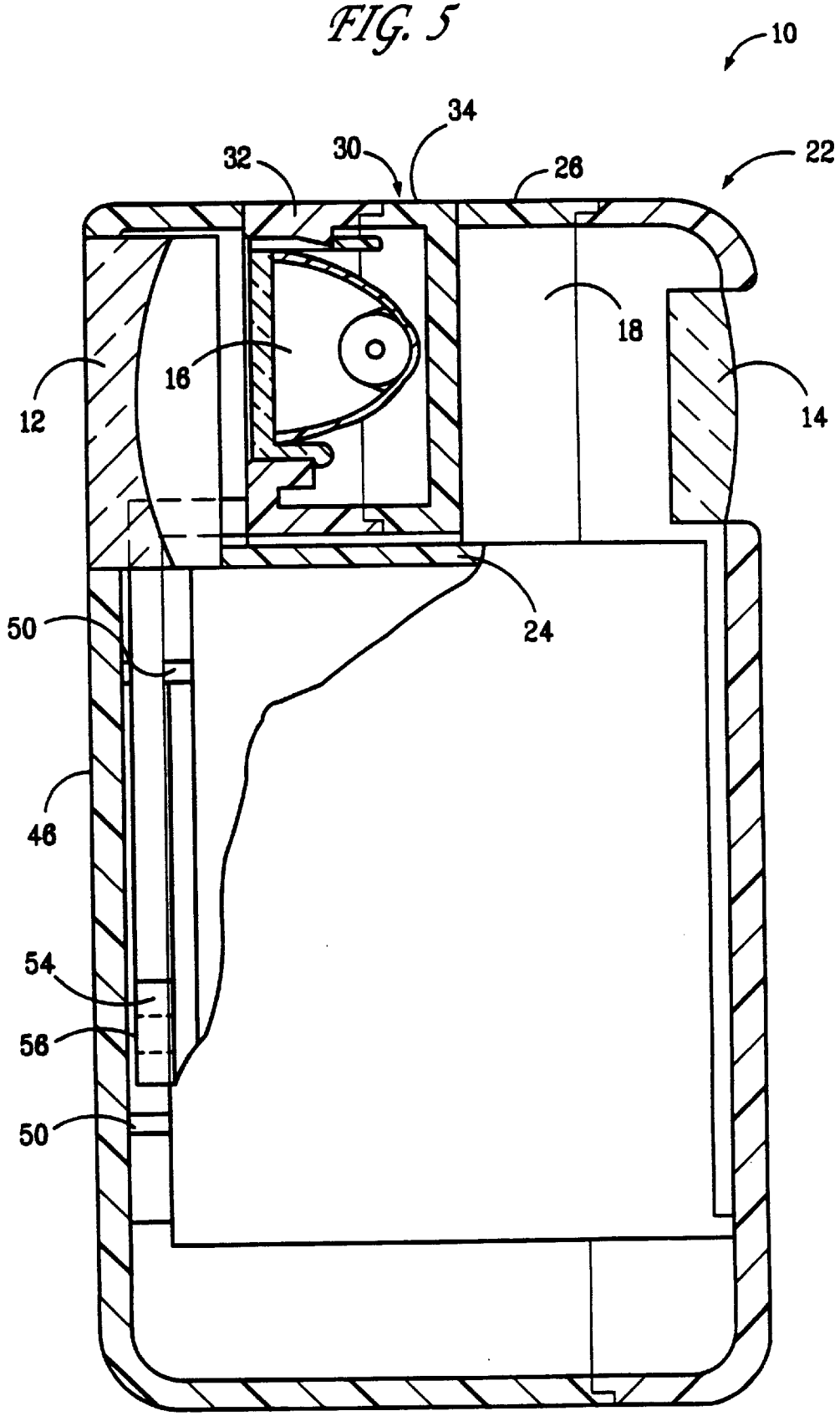
FIG. 5 is a cross-section taken along line 5—5 of FIG. 2.
Figure 6:
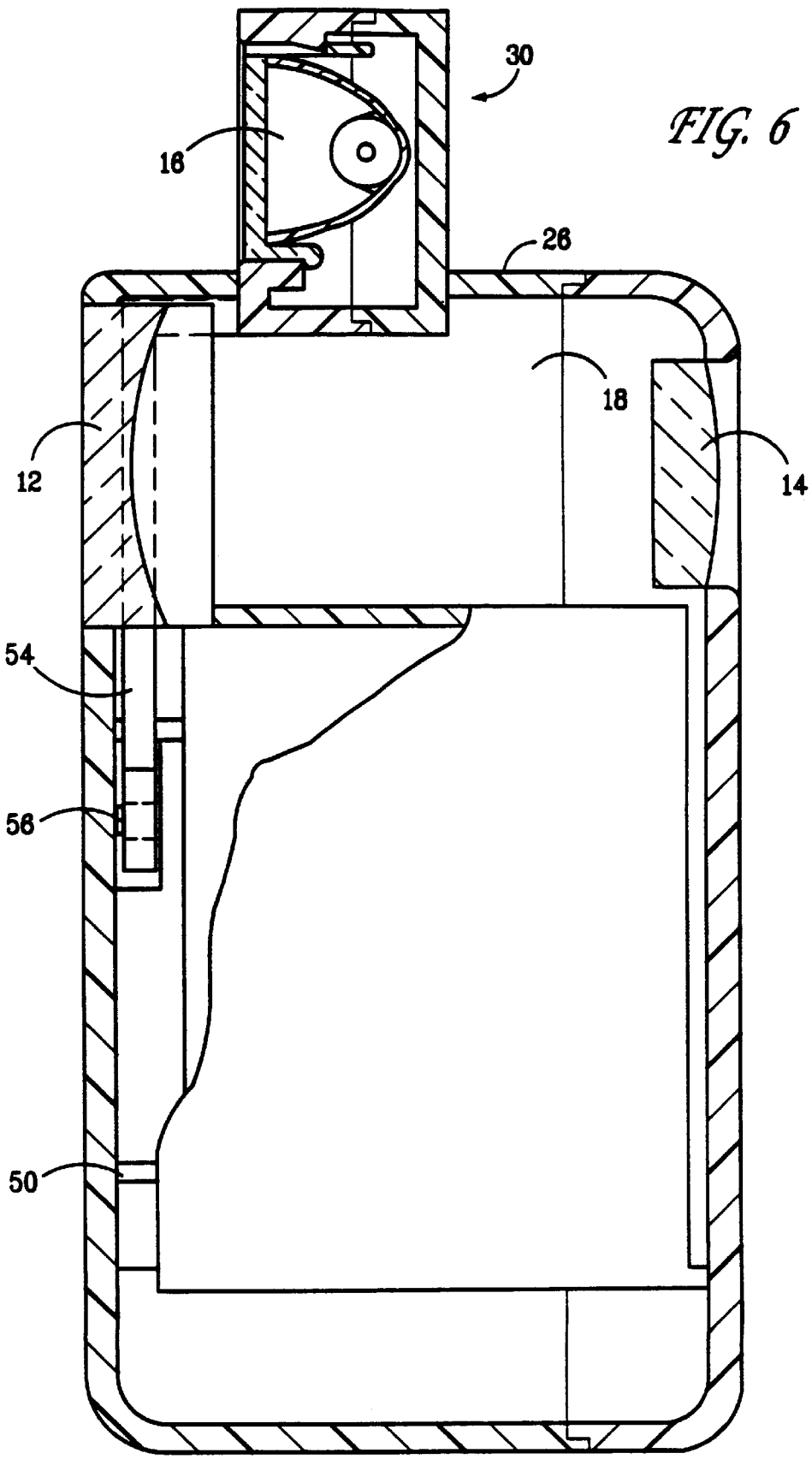
FIG. 6 is a cross-section taken along line 6—6 of FIG. 3.

As referred to above, the camera 10 has a viewfinder 22 that includes a first and a second viewfinder lens 12, 14, which are best seen in FIGS. 5 and 6. Both the first viewfinder lens 12 and the second viewfinder lens 14 are rigidly fixed to the camera 10, so that they are not moveable with respect to the camera and the camera user can focus on an object. The first viewfinder lens 12 is mounted to the front of the camera 10, and the second viewfinder lens 14 is mounted to the back of the camera 10. Both of these lenses 12, 14 may be affixed to the camera 10 by any of a variety of fastening techniques including, but not limited to, interference fits, adhesives and mechanical fasteners. The first and the second viewfinder lens 12, 14 are aligned so that a camera user can view an object whose picture is to be taken with the camera by placing the second viewfinder lens 14 proximal to one of the camera user's eyes. Disposed in between the first and the second viewfinder lenses 12, 14 is a viewfinder air space 18. The viewfinder air space 18 is defined by the volume of space between the first and the second viewfinder lenses 12, 14, a viewfinder air space bottom surface 24, the top of the camera 26 and a pair of viewfinder air space sides 28.

The camera of this invention also has a flash 16 for exposing the film when the level of ambient light is not sufficient to expose the film to the desired amount of light. The flash 16 may be disposed in a flash housing 30. The flash housing 30 may be any of a variety of types. By way of example, one type of flash housing 30 is illustrated in FIGS. 5 and 6. As shown the flash housing 30 has a front and a back. The front 32 and the back 34 of the flash housing may be coupled together in a variety of manners. For instance, the front 32 and the back may snap together, or be connected with a tongue and groove fastener or mechanical fasteners, or they may slidably engage as shown in FIGS. 5 and 6. These mechanisms for coupling the front and the back of the flash housing are provided by way of example. The flash housing need not have a front 32 and a back 34. For instance, the flash housing 30 may have a left and a right piece. Furthermore, the flash housing 30 may be constructed from a single piece or any number of pieces that are connected with a variety of fastening techniques.

Figure 2:
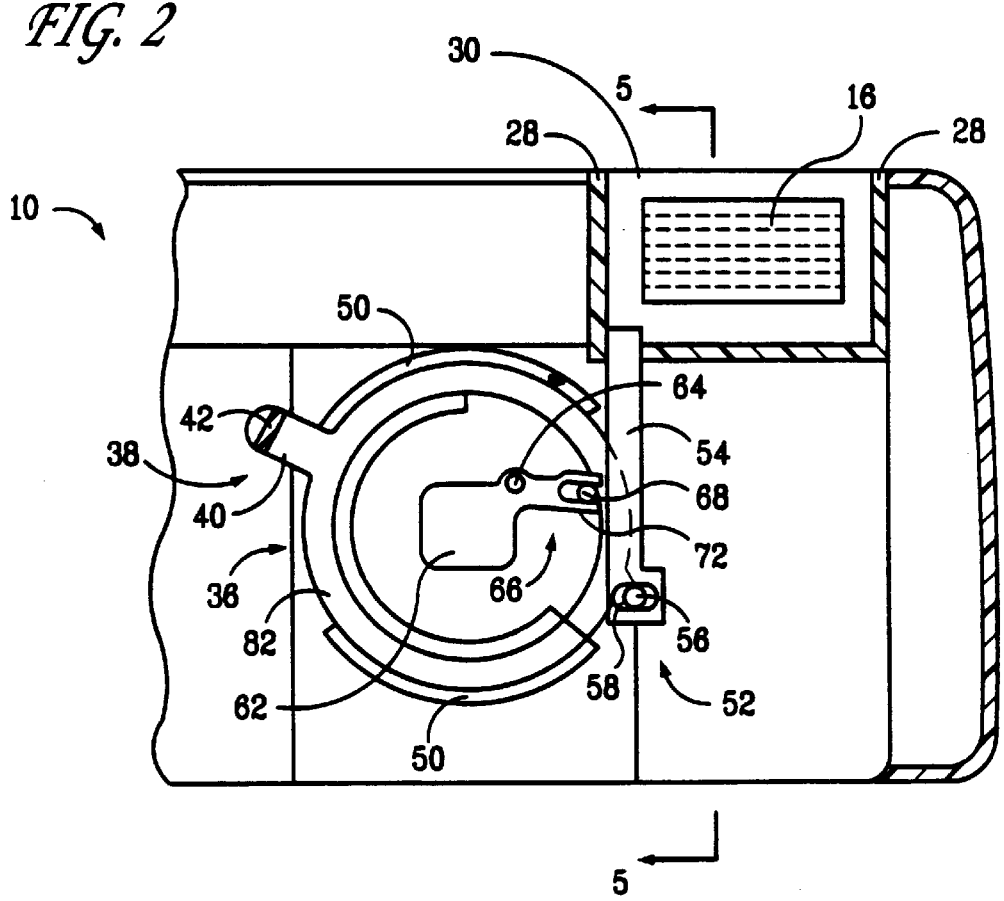
FIG. 2 is a diagrammatical view of a portion of the inside of the camera of FIG. 1 with the camera flash in a stored position.
Figure 3:
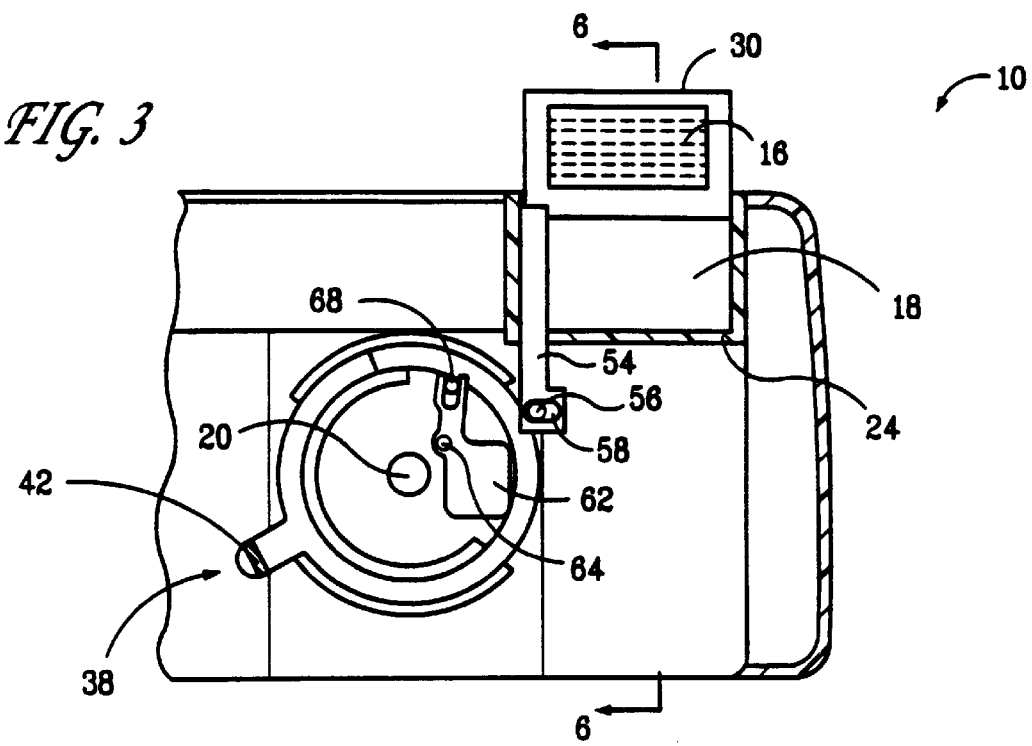
FIG. 3 is a diagrammatical view of the camera of FIG. 1 with the camera flash in an operable position.
Figure 4:
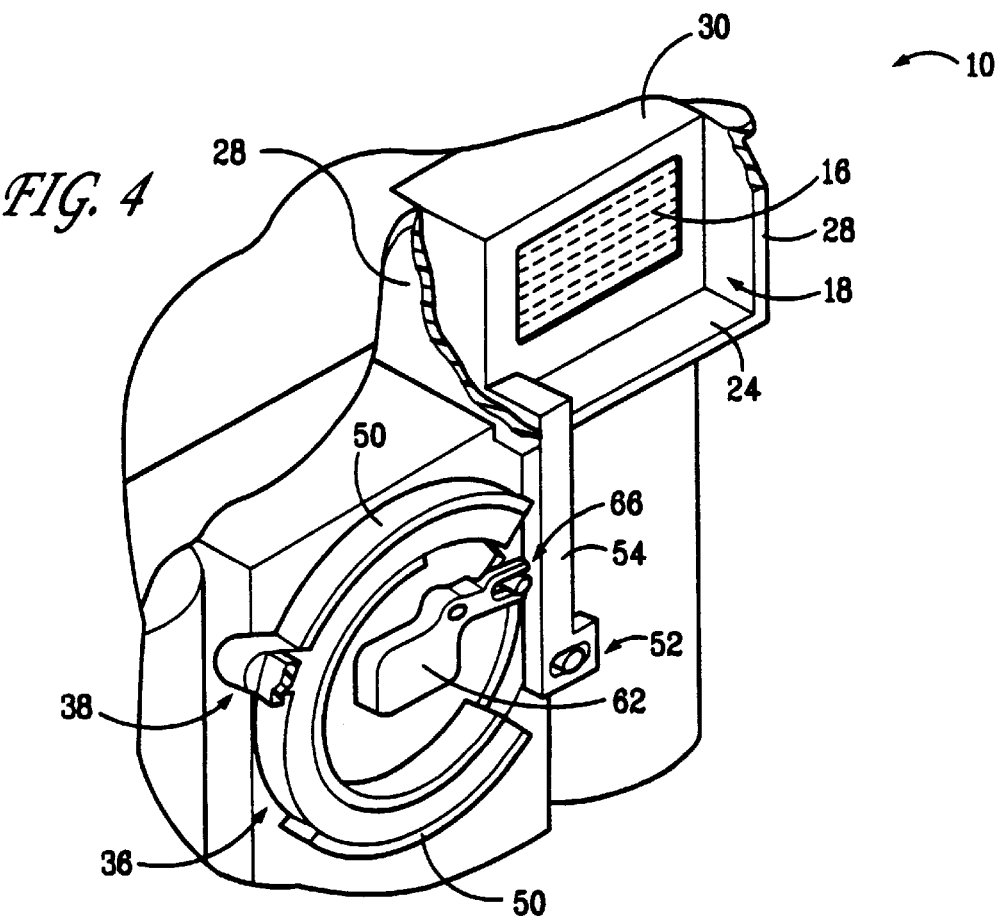
FIG. 4 is a is a diagrammatical view of the camera of FIG. 1 with the camera flash in a stored position.

The camera flash 16 and the flash housing 30 are moveable between a stored position and an operable position, which is best understood by comparing FIGS. 2, 4 and 5 with FIGS. 3 and 6. In the stored position, the flash 16 and the flash housing 30 are disposed in the viewfinder air space 18 between the first viewfinder lens 12 and the second viewfinder lens 14, as best illustrated in FIGS. 2, 4 and 5. In this stored position, the flash housing 30 rests on the viewfinder air space surface 24.

In the operable position, the flash 16 and the flash housing 30 are at least partially external to the viewfinder air space 18, and the camera user can see through the viewfinder lenses 12, 14 to view an object whose picture is to be taken, as best seen in FIGS. 3 and 6. Thus, the camera 10 of this invention employs a moveable flash 16 that is stored between a pair of fixed viewfinder lenses 12, 14. As discussed above, this facilitates making cameras smaller in size.

In order to move the flash 16 and/or the flash housing 30 between the stored position and the operable position, the camera 10 may have an actuator 36. Preferably, the actuator 36 is a rotatable ring, as is best depicted in FIGS. 2–4. Extending from or coupled to the actuator 36 may be an operating mechanism 38. In the preferred embodiment show in FIGS. 2–4 the operating mechanism 38 includes an arm 40 that has a tab 42. The operating mechanism 38 may be, as is described below, manipulated by the camera user to move the actuator 36, thereby moving the flash 16 between the stored position and the operable position. The arm 40 preferably extends along a radial line from the center of the actuator 36. The tab 42 extends from the arm 40, as best shown in FIGS. 2–4. In this embodiment, the tab 42 extends substantially perpendicular to the arm 40. However, the arm 40 and the tab 42 may be configured in any of a variety of manners. The operating mechanism 38 of this camera 10 may further include a groove 44 disposed in the front 46 of the camera 10, as is shown in FIG. 1. In this preferred embodiment, the groove 44 is arc shaped about the geometric center 48 of the front 46 of the camera.

Disposed within the groove 44 is the tab 42. The tab 42 extends from inside of the camera to at least flush with the groove 44 and extends above the depth of the groove 44 a relatively short distance, so that a camera user can manipulate the tab 42 with little difficulty. The tab 42 is slidable within the groove 44, as explained in further detail below. The actuator 36 is preferably rotatably mounted to the camera 10, as described below, so that when the tab 42 is manipulated or rotated along the groove 44, the actuator 36 rotates with the tab 42. One end of the groove 44 is circular in shape. As is described in further detail below, the operating mechanism 38 is moveable from a first position in which the tab 42 rests in a first end 43 of the groove 44 and the flash 16 is in the stored position to a second position in which the tab 42 rests in a second end 45 of the groove 44 and the flash 16 is in the operable position.

The camera may also include one or more rails 50, that at least partially encase the actuator 36 and act as a guide as the actuator 36 rotates in response to manipulation of the tab 42. These rails 50 serve as stops for the armed tab 42 extending from the actuator 36. That is, they limit the travel of the armed tab 42. However, since the groove 44 also limits the travel of the armed tab 42, this function of the rails 50 is duplicative of that of the groove 44 and therefore, the rails 50 need not limit the travel of the armed tab 42.

The camera 10 further includes a connecting mechanism 52 for connecting the flash 16 or the flash housing 30 with the actuator 36. In the embodiment illustrated in FIG. 1–4, the mechanism 52 for connecting the flash housing 30 to the actuator 36 is a lever 54 and a pin 56. Other types of connecting mechanisms 52 may be employed, such as a plurality of levers or gears or the like. The lever 54 may be attached to the flash housing 30 with any of a variety of conventional fastening techniques or alternatively, as shown in FIGS. 4–6, the lever 54 may be formed integrally with the flash housing 30. For instance, the lever 54 may be integrally formed with the flash housing 30 from molded plastic.

Extending from the actuator 36 is a pin 56 of the connecting mechanism 52. Preferably this pin 56 extends from the outer periphery of the actuator 36. The lever 54, as is shown in FIGS. 2–5, includes a generally oval shaped aperture 58 for receiving this pin 56. The pin 56 is movable within the aperture 58 so that when the pin 56 rotates with the actuator 36 the pin 56 moves within the aperture 58 and pushes the lever 54 to convert rotary motion of the actuator 36 into linear motion of the lever 54 and the flash housing 30.

As alluded to above, the camera 10 includes a lens 20 for exposing film to light from an object whose picture is being taken with the camera 10. The actuator 36 preferably rotates about the lens 20. Disposed over the lens 20 may be a movable lens cover 62. This lens cover 62 is preferably moveable between a closed position in which it covers the lens, as shown in FIGS. 2 and 4, and an open position, in which the lens 20 is exposed, as shown in FIG. 3. In the embodiment shown, the lens cover 62 is rotatably mounted to the camera 10. A pivot pin 64 may extend through a cavity in the lens cover 62 to affix the lens cover 62 to the camera 10, so that the lens cover 62 can rotate about the pivot pin 64.

The lens cover 62 may be coupled to the actuator 36 by a coupling mechanism 66, so that manipulation of the actuator 36 moves the lens cover 62 between the open position and the closed position. The coupling mechanism 66 further includes a forked end 72 of the lens cover 62 that surrounds a finger 68 extending out from the inner periphery of the actuator 36. In this manner, the finger 68 may be slidably fit to the lens cover 62. Since the finger 68 is coupled to the actuator 36, movement of the actuator 36 will cause movement of the lens cover 62, as described in further detail below. Therefore, when the tab 42 of the operating mechanism 38 is rotated and the actuator 36 is rotated, the finger 68 rotates with the actuator 36 and rotates the lens cover 62. The camera 10 of this invention is not limited to this type of coupling mechanism 66, and others may be employed. The lens cover 62 may be coupled to the finger 68 in any of a variety of manners.

In order to operate the camera 10, the camera user will typically begin using the camera 10 as it appears in FIGS. 2, 4 and 5, that is with the flash 16 and the flash housing 30 in the stored position in the viewfinder air space 18, the operating mechanism 38 in its first position and the lens cover 62 in its covered position. In order to operate the camera 10, the camera user manipulates the tab 42 of the operating mechanism 38 to rotate the operating mechanism 38 in a counter clockwise direction from its first position, as shown in FIG. 2, to its second position, as shown in FIG. 3. When the operating mechanism 38 is rotated to its second position, the attached actuator 36 also rotates in a counterclockwise direction from its first position, as shown in FIG. 2, to its second position as shown in FIG. 3.

When the actuator 36 rotates, two things occur. First, the flash 16 and the flash housing 30 move from their stored position, as shown in FIGS. 2 and 4, in the viewfinder air space 10 to the operable position, as shown in FIG. 3, in which the flash 16 and the flash housing 30 are at least partially external to the viewfinder air space 18. The flash 16 and flash housing 30 move from the stored position to the operable position, in response to manipulation of the operating mechanism 38, as follows. When the operating mechanism 38 is moved to its second position, this moves the actuator 36 to its second position. Because the connecting mechanism 52 connects the flash 16 and the flash housing 30 to the actuator 36, the movement of the actuator 36 moves the connecting mechanism 52, and in particular the pin 56 of the connecting mechanism 52. The pin 56 rotates counter clockwise with the actuator 36 and moves within the aperture 58 of the connecting mechanism 52 thereby pushing the lever 54 of the connecting mechanism 52 and the flash 16 and the flash housing 30 in an upward direction from the stored position to the operable position. Due to the oval shape of the hole, as the pin 56 moves in a generally arc like upward manner, the flash 16 and the flash housing 30 are only moved in the upward (y) direction and little or no force is applied to cause the flash 16 and the flash housing 30 to move in the lateral (x) direction and the forward direction (z), as shown in FIG. 2.

Likewise, the coupling mechanism 66, and in particular the finger 68 of the coupling mechanism 66, rotate in the counterclockwise direction with the actuator 36. As the finger 68 rotates, the attached lens cover 62 also rotates about the pivot pin 64 from its covered position to its uncovered position to expose the camera lens 20.

When the camera user has completed taking pictures, the camera user can manipulate the operating mechanism 38 to move it from its second position to its first position. Upon moving the operating mechanism 38, the actuator 36 rotates from its second position, as shown in FIG. 3, to its first position, as shown in FIG. 2. As the actuator 36 moves back to its first position, the connecting mechanism 52 is also rotated in the clockwise direction. More specifically, the pin of the connecting mechanism 52 is rotated and the lever 54 is moved in the downward direction. As the lever 54 moves downward, the flash 16 and the flash housing 30 are displaced back into the viewfinder air space 18 into the stored position.

The movement of the actuator 36 also causes the coupling mechanism 66 to rotate in the clockwise direction. This in turn causes the lens cover 62 to rotate about the pivot pin 64 from the uncovered position to the covered position to cover and thereby protect the lens. Thus, the manipulation of the operating mechanism 38 from its second position to its first position causes the flash 16 to move from its operable position to its stored position and the lens cover 20 to move from its uncovered position to its covered position.

Figure 7:
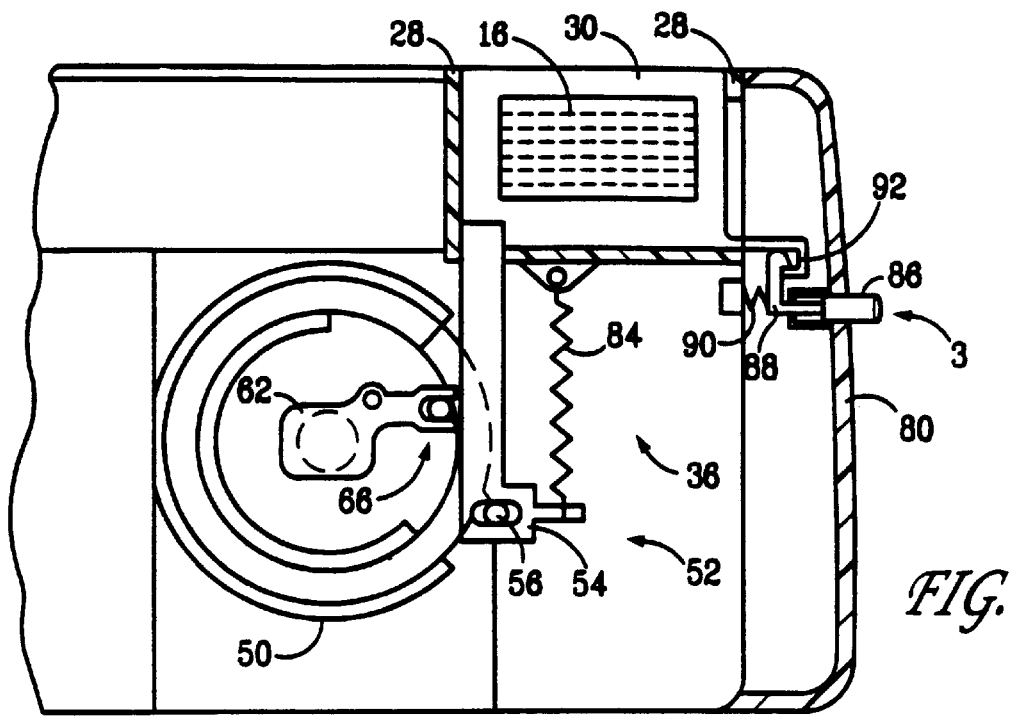
FIG. 7 is a diagrammatical view of a second preferred embodiment of the camera of this invention with the camera flash in a stored position.
Figure 8:
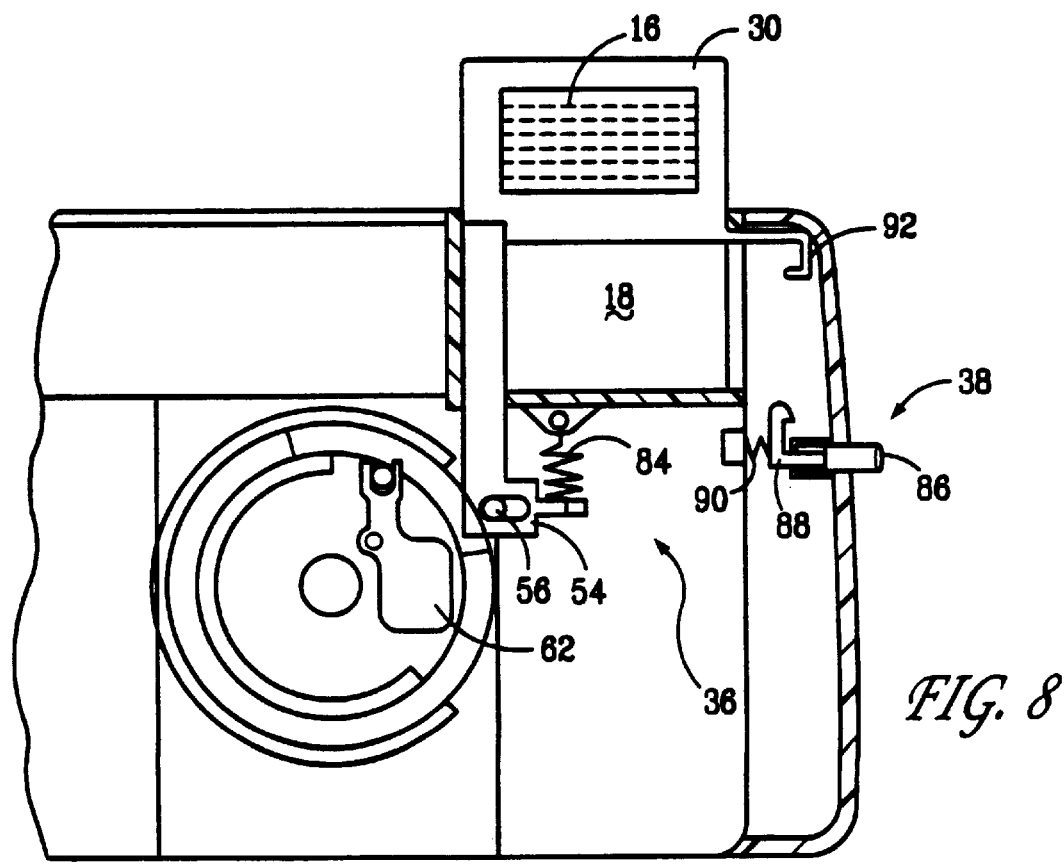
FIG. 8 is another diagrammatical view of the preferred embodiment of FIG. 7 with the camera flash in an operable position.

A second preferred embodiment of the camera of this invention is illustrated in FIGS. 7 and 8. This embodiment also includes a flash 16 and a flash housing 30 that are movable from a stored position within a viewfinder air space 18 to an operable position external to the viewfinder air space 18. Similar to the embodiment described above, the viewfinder air space 18 is defined in part by a first and a second non-moveable viewfinder lenses 12, 14. This embodiment also includes a lens 20, a lens cover 62 that is rotatably mounted to a rotatable ring 82 and a pair of guide rails 50. Further, this second preferred embodiment also includes a coupling mechanism 66 and a connecting mechanism 52.

This second preferred embodiment also includes an actuator 36 having a spring 84 coupled to the lever 54 to spring bias the lever 54 in an upward direction. The biasing of the spring 84 tends to push the lever 54 and the flash housing 30 to the operable position and to rotate the ring 82 and the attached lens cover 62 to the uncovered position.

The second preferred embodiment also includes an operating mechanism 38. As is shown in FIG. 7 and 8, the operating mechanism 38 may include a push button 86 and the actuator 36 may further include a hook lever 88, a spring 90 and a flash lever 92. As is shown in FIG. 7, the spring 90, biases the hooked lever 88 towards the side of the camera 10. This in turn biases the hooked lever 88 to engage the flash lever 92 and hold the flash 16 and the flash housing 30 in the stored position, as is shown in FIG. 7, within the viewfinder air space. This biasing is against the biasing provided by the spring 84, which tends to bias the flash 16 and the flash housing 30 to the operable position.

In order to move the flash 16 and the flash housing 30 from the stored position, as shown in FIG. 7, to the operable position, as shown in FIG. 8, the camera user depresses the push button 86, causing the hooked lever 88 to move and release the flash lever 92. When the flash lever 92 is released from engagement with the hooked lever 88, the spring 84 pulls the flash 16 and the flash housing 30 from the stored position, within the viewfinder air space, as shown in FIG. 7, to the operable position, as shown in FIG. 8, by pulling the lever 54 in the vertical direction.

Furthermore, when the spring 84 pulls the lever 54 to move the flash 16 and the flash housing 30 to the operable position, the lever 54 also rotates the ring 82 in a counterclockwise direction as shown in FIG. 8. Rotation of the ring 82 causes rotation of the lens cover 62 about 90° from the covered position shown in FIG. 7 to the uncovered position shown in FIG. 8.

Figure 9:
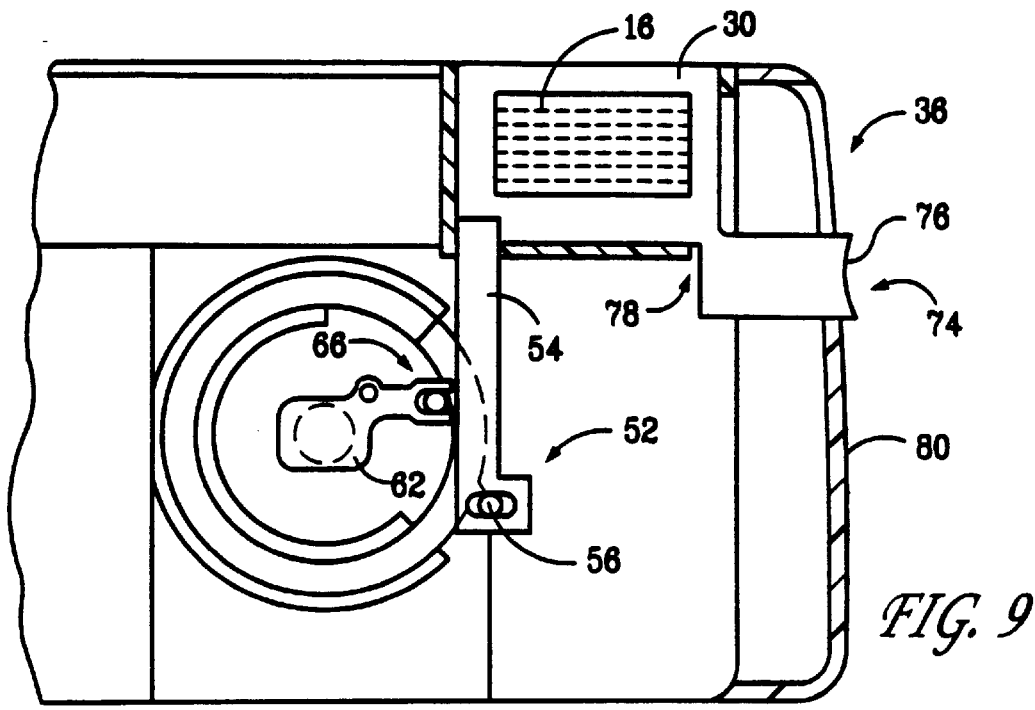
FIG. 9 is diagrammatical view of a third preferred embodiment of a camera of this invention with the camera flash in the stored position.
Figure 10:
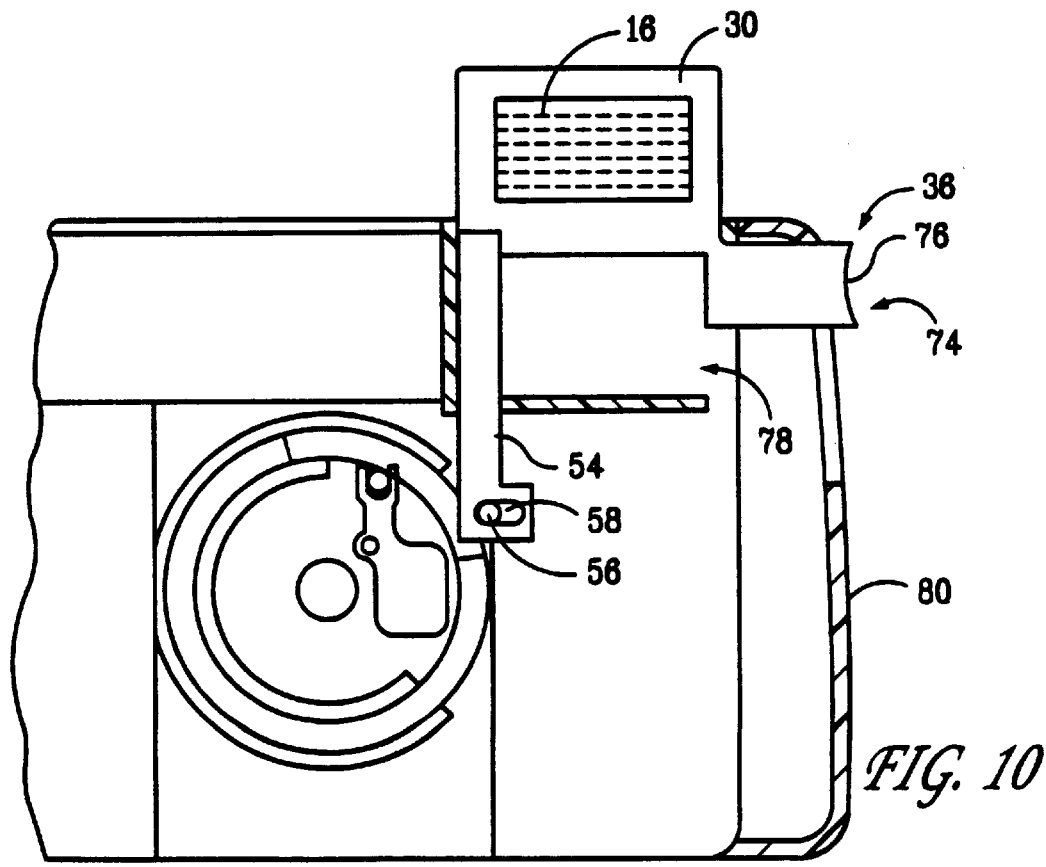
FIG. 10 is another diagrammatical view of the preferred embodiment of FIG. 9 with the camera flash in an operable position.

A third preferred embodiment of the camera of this invention is illustrated in FIGS. 9–10. Similar to the embodiment described above, the flash 16 and the flash housing 30 are moveable between a stored position and an operable position and the lens cover 62 is moveable between a lens covered position and an uncovered position. In this embodiment, the actuator 36 is defined integrally within the flash housing 30. As shown in FIGS. 9–10, the flash housing 30 is attached to a sideable switch 76 in the side 74 of the camera 10 so that the camera user can push the flash housing 30 between the stored and operable positions. In addition, one of the viewfinder air space sides has a cut-out region 78 so that the flash housing 30 extends to the periphery of the side 80 of the camera and preferably aligns with the side 80 or extends slightly beyond the periphery.

The flash housing 30 is preferably coupled to a rotating ring 82 disposed around the lens, so that linear movement of the flash housing 30 will cause rotation of the ring 82. Similar to the embodiment described above, the connecting mechanism 52 may include a lever 54 and a pin 56. The lens cover 62 may also be coupled to the rotatable ring 82 by a coupling mechanism 66, similar to the one described above.

In order to operate this embodiment, the camera user slides the switch 76. By pushing the flash housing 30 from the stored position to the operable position, the ring 82 is rotated in the counterclockwise direction, as seen in FIGS. 9–10. The lens cover 62 rotates with the ring 82 about the pivot pin from the covered position to the uncovered position. The camera 10 is ready to take pictures. Thus, in this embodiment, the actuator 36 is coupled to the flash housing 30 so that movement of the flash housing 30 drives movement of the lens cover 62.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A camera, comprising:
   a lens mounted to the camera through which light can be emitted to expose film;
   a non-moveable first viewfinder lens rigidly affixed to the camera;
   a non-moveable second viewfinder lens rigidly affixed to the camera and aligned with the non-moveable first viewfinder lens;
   a viewfinder air space defined by a region between the first viewfinder lens and the second viewfinder lens; and
   a moveable flash disposed in the viewfinder air space, the moveable flash being moveable between a stored position, in which the movable flash is stored in the viewfinder air space and an operable position, in which at least part of the moveable flash is disposed external to the viewfinder air space.

2. The camera of claim 1, further comprising a rotatable actuator, coupled to the moveable flash, the actuator being moveable between a first position and a second position so that the actuator can move the flash from the stored position to the operable position when the actuator moves from the first position to the second position.

3. The camera of claim 2, further comprising an operating mechanism extending from the actuator and being operative to be manipulated by a camera user to move the actuator from the first position to the second position.

4. The camera of claim 2, further comprising a lens cover, disposed over the lens, the lens cover being moveable between a closed position in which the lens cover is disposed over the lens and an open position in which the lens cover is not disposed over the lens.

5. The camera of claim 4, wherein the lens cover is rotatably linked to the actuator, so that rotation of the actuator from the first position to the second position moves the lens cover from the closed position to the open position.

6. The camera of claim 4, wherein the lens cover is linked to the actuator by a pin.

7. The camera of claim 1, further comprising a flash housing that encloses the flash and is moveable with the flash between the stored position and the operable position.

8. The camera of claim 7, further comprising a lever, extending from the flash housing, the lever being operative to move in response to movement of the actuator to move the flash housing and the flash between the stored position and the operable position.

9. The camera of claim 8, wherein the lever is linked to the actuator so that rotation of the actuator moves the lever and thereby moves the flash and the flash housing between the stored position and the operable position.

10. The camera of claim 1, further comprising an operating mechanism, disposed on a side of the flash, that is engageable by a camera user to drive the flash between the stored position and the operable position.

11. The camera of claim 10, further comprising a lens cover coupled to the flash so that operation of the operating mechanism causes the lens cover to move between a closed position in which the lens cover covers a lens of the camera and an open position in which the lens cover does not cover the lens.

12. A camera, comprising:
a lens mounted to the camera through which light can be emitted to expose film;
a non-moveable first viewfinder lens rigidly affixed to the camera;
a non-moveable second viewfinder lens rigidly affixed to the camera and aligned with the non-moveable first viewfinder lens;
a viewfinder air space defined by a region between the first viewfinder lens and the second viewfinder lens;
a moveable flash disposed in the viewfinder air space, the moveable flash being moveable between a stored position, in which the movable flash is stored in the viewfinder air space and an operable position, in which at least part of the moveable flash is disposed external to the viewfinder air space; and
an actuator, coupled to the moveable flash, and that is operable to drive the moveable flash between the stored position and an operable position.

13. The camera of claim 12, wherein the actuator is moveable between a first position and a second position, so that the actuator can move the flash from the stored position to the operable position when the actuator moves from the first position to the second position.

14. The camera of claim 13, further comprising an operating mechanism extending from the actuator that may be manipulated by a camera user to move the actuator from the first position to the second position.

15. The camera of claim 13, further comprising a lens cover, disposed over the lens, the lens cover being moveable between a closed position in which the lens cover is disposed over the lens and an open position in which the lens cover is not disposed over the lens.

16. The camera of claim 15, wherein the actuator and the lens cover are each rotatably mounted to the camera and wherein the lens cover is coupled to the actuator, so that rotation of the actuator from the first position to the second position moves the lens cover from the closed position to the open position.

17. The camera of claim 16, wherein the lens cover is coupled to the actuator by a pin.

18. The camera of claim 12, further comprising a flash housing that encloses the flash and is moveable with the flash between the stored position and the operable position.

19. The camera of claim 18, further comprising a lever extending from the flash housing that moves in response to movement of the actuator to move the flash housing and the flash between the stored position and the operable position.

20. The camera of claim 14, wherein the operating mechanism comprises a push button disposed on a side of the camera.

21. The camera of claim 14, wherein the actuator comprises ribs on a side of a flash housing that houses the flash, so that a camera user can engage the ribs to push the flash housing and the flash between the stored position and the operable position.

22. The camera of claim 20, wherein the actuator comprises a spring that biases the flash to the operable position and that is released by depression of the push button to move the flash to the operable position.

23. A camera, comprising:
a lens mounted to the camera through which light can be emitted to expose film;
a non-moveable first viewfinder lens rigidly affixed to the camera;
a non-moveable second viewfinder lens rigidly affixed to the camera and aligned with the non-moveable first viewfinder lens;
a viewfinder air space defined by a region between the first viewfinder lens and the second viewfinder lens;
a moveable flash disposed in the viewfinder air space, the moveable flash being moveable between a stored position, in which the movable flash is stored in the viewfinder air space and an operable position, in which at least part of the moveable flash is disposed external to the viewfinder air space; and
a rotatable actuator, coupled to the moveable flash, the actuator being moveable between a first position and a second position so that the actuator can move the flash from the stored position to the operable position when the actuator moves from the first position to the second position.

24. The camera of claim 23, further comprising an operating mechanism extending from the actuator that is operative to be manipulated by a camera user to move the actuator from the first position to the second position.

25. The camera of claim 23, further comprising a lens cover, disposed over the lens, the lens cover being moveable between a closed position in which the lens cover is disposed over the lens and an open position in which the lens cover is not disposed over the lens.

26. The camera of claim 25, wherein the lens cover is rotatably mounted to the actuator, so that rotation of the actuator from the first position to the second position moves the lens cover from the closed position to the open position.

27. The camera of claim 25, wherein the lens cover is coupled to the actuator by a pin.

28. The camera of claim 23, further comprising a flash housing that encloses the flash and is moveable with the flash between the stored position and the operable position.

29. The camera of claim 23, further comprising a lever, extending from the flash housing, the lever being for moving in response to movement of the actuator to move the flash housing and the flash between the stored position and the operable position.

30. The camera of claim 29, wherein the lever is coupled to the actuator so that rotation of the actuator moves the lever and thereby moves the flash and the flash housing between the stored position and the operable position.

31. The camera of claim 23, further comprising a tab extending from the actuator for manipulation by a camera user to move the actuator from the first position to the second position.

32. A camera, comprising:

a picture taking lens mounted to the camera through which light can be emitted to expose film;

a non-moveable first viewfinder lens rigidly affixed to the camera;

a non-moveable second viewfinder lens rigidly affixed to the camera and aligned with the non-moveable first viewfinder lens;

a viewfinder air space between the non-moveable first viewfinder lens and the non-moveable second viewfinder lens;

a moveable flash mounted inside of the viewfinder air space, the moveable flash being moveable between a stored position, in which the movable flash is stored in the viewfinder air space and an operable position, in which at least a portion of the moveable flash is external to the viewfinder air space; and a lens cover, disposed over the lens, and being hinged to the camera so that the lens cover can move between a covered position in which the lens cover covers the picture taking lens and an uncovered position in which the picture taking lens is uncovered.

33. The camera of claim 32, further comprising an actuator, for moving the lens cover between the covered position and the uncovered position and wherein the flash is responsive to movement of the lens cover, so that when the lens cover moves from the covered position to the uncovered position, the flash moves from the stored position to the operable position.

34. The camera of claim 32, further comprising an actuator for moving the flash between the stored position and the operable position and wherein the lens cover is responsive to movement of the flash, so that when the flash moves from the stored position, the lens cover moves from the covered position to the uncovered position.

\* \* \* \* \*

UNITED STATES PATENT AND TRADEMARK OFFICE
CERTIFICATE OF CORRECTION

PATENT NO. : 6,304,728 B1
DATED : October 16, 2001
INVENTOR(S) : Wilfried Bittner It is certified that error appears in the above-identified patent and that said Letters Patent is hereby corrected as shown below:

<u>Title page,</u>
Item [56], References Cited: 3,852,728 please delete "Roinson" and insert therefor -- Robinson --;

Signed and Sealed this

Eleventh Day of June, 2002

Attest:

JAMES E. ROGAN
Attesting Officer     *Director of the United States Patent and Trademark Office*